Feb. 22, 1949.  F. E. PAYNE  2,462,280
SEAL ADAPTOR
Filed Aug. 9, 1945
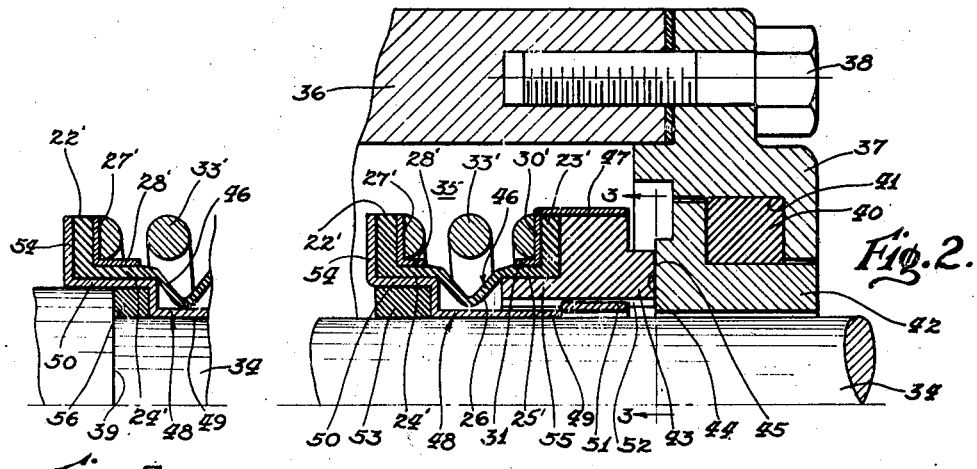
Fig. 2.
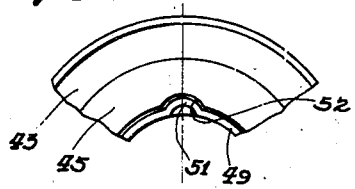
Fig. 4.
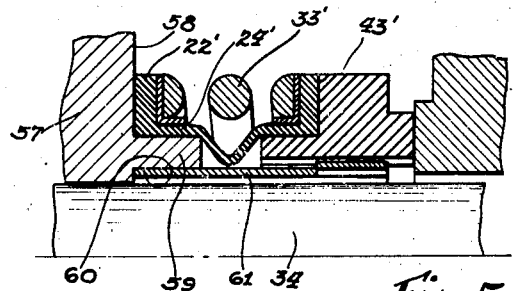
Fig. 3.
Fig. 5.
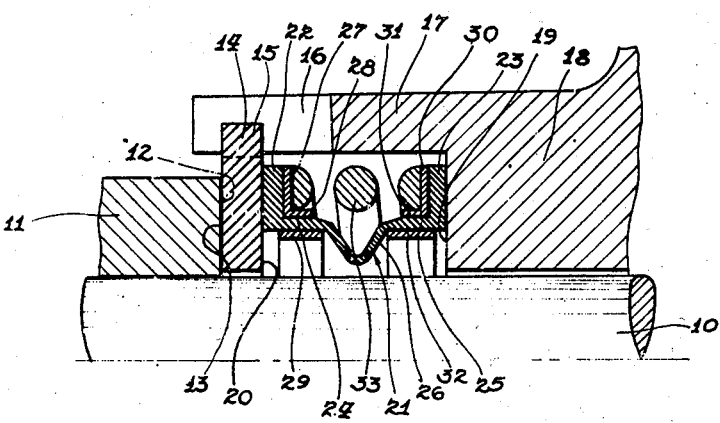
Fig. 1.
INVENTOR.
Frank E. Payne
BY Charles P. Vrijtedl
atty.

Patented Feb. 22, 1949

2,462,280

UNITED STATES PATENT OFFICE 2,462,280

SEAL ADAPTER

Frank E. Payne, Glencoe, Ill.

Application August 9, 1945, Serial No. 609,845

5 Claims. (Cl. 286—11)

This invention relates to rotary seals of the type wherein a seal is effected between two relatively rotatable surfaces located in a plane transverse to the axis of rotation.

In my prior application, Serial No. 573,163, filed January 17, 1945, there is disclosed a seal for a pump or the like wherein a seal is effected between two relatively rotatable elements located in planes transverse to the axis of rotation, one of said elements being flexibly supported so as to be movable freely, axially and radially, in response to vibrations of the rotatable member. The other element is sealed with respect to its support by a resilient deformable bellows element made of rubber, either synthetic or natural, or of some similar material, and having spaced flanges between which is compressed a spring.

This design of flexible resilient element is useful in many hydraulic applications wherein a seal is desired between two parallel radial surfaces. There are some installations, however, where two parallel radial surfaces are not available for the resilient sealing element and hence the seal must be effected between a shaft or some cylindrical element and a plane surface normal to the axis of the shaft or cylinder. Now, in order to provide resilient sealing elements in sufficient numbers and at sufficiently low cost to meet commercial requirements, it is necessary to make multiple cavity molds for each size of element correponding to the more commonly used shaft sizes. Thus it may be necessary to provide one or more multiple cavity molds for each $\frac{1}{16}$" increment in shaft size from about $\frac{3}{8}$" diameter to several inches. Such molds are expensive and represent a considerable capital investment which must be made even before production can begin. It would be desirable, therefore, to provide a resilient sealing element so designed that it may be utilized for a large number of shaft sizes as well as types of installations without a corresponding number of molds to be used in its production.

The principal object of this invention, therefore, is to provide a seal which utilizes a sealing element having parallel radially disposed flanges as the basic or principal element of the seal, with means for adapting this basic element for use as a shaft seal.

A more specific object of this invention is to provide a seal having spaced flanges disposed in radial planes and having a tubular adaptor which is press-fitted upon a shaft and upon which a sealing element is preloaded so as to comprise a self-contained shaft seal unit.

A still more specific object of this invention is to provide an adaptor for a sealing element of the parallel flange type wherein the adaptor is provided with a sliding driving connection with a sealing washer, and the other end is pressed upon a rubber ring which in turn is preloaded upon a shaft.

These and other objects and features of this invention will become apparent from the following detailed description of the invention when taken together with the accompanying drawings, in which Fig. 1 is a section taken through the seal disclosed in my prior application;

Fig. 2 is a section taken through the seal of Fig. 1 when assembled with an adaptor for adapting the seal to operation on a shaft;

Fig. 3 is a fragmentary elevation taken along the line 3—3 of Fig. 2 showing the means for driving the sealing washer;

Fig. 4 is a modification of the seal of Fig. 2, and

Fig. 5 is a further modification of the seal of Fig. 2.

In order to secure a better understanding of the present invention, reference is now made to Fig. 1 for a detailed description of the seal shown in my prior application. In this figure there is shown a shaft 10 which for purposes of illustration may be the shaft for the water pump of an automobile engine water-cooling system. Press-fitted upon said shaft 10 is an impeller 11, only the hub of which is shown for the sake of brevity, said impeller having a radially disposed sealing surface 12 against which is pressed a corresponding sealing surface 13 of a sealing washer 14 made of suitable anti-friction material such as synthetic thermosetting resin containing powdered metal alloy of lead, antimony and tin. Said washer is provided with ears 15 which project into slots 16 formed in a cup 17 extending radially from a housing 18 which supports the shaft 10 by suitable bearing means (not shown). A radially disposed surface 19 is formed on the inside of cup 17, said surface 19 being axially spaced relative to the back surface 20 of washer 14.

To effect a seal between back surface 20 of washer 14 and surface 19 in the cup, a sealing element 21 is provided. This sealing element includes spaced radial flanges 22 and 23, flange 22 bearing against surface 20 and flange 23 bearing against surface 19. Extending axially from each of said flanges 22 and 23 are cylindrical sections 24 and 25, respectively, which in turn are connected by a thin fold 26. The purpose of fold 26 is to provide a means for permitting flange 22 to move freely in any direction with respect to flange 23 to follow vibrations of shaft 10 as transmitted through it to washer 14. It is understood that the exact shape of fold 26 may be varied to suit particular requirements and need not be of the V shape shown.

Adjacent flange 22 is a ferrule 27 having an axial flange 28 formed thereon which bears against the outer surface of cylindrical portion 24. On the inside of cylindrical portion 24 is a short tube 29, said tube 29 and flange 28 of ferrule 27 being so spaced that cylindrical portion 24 is compressed between them. A similar ferrule 30 having an axially extending flange 31 and cooperating with a short tube 32 are utilized in connection with cylindrical section 25 to compress the latter therebetween. A spring 33 is compressed between ferrules 27 and 30 and maintains the requisite pressure upon flange 22 and sealing washer 14 to maintain a seal between surfaces 12 and 13.

The sealing element described with reference to Fig. 1 thus provides a means for effecting a seal between a washer and its support with a minimum of installation difficulty. Such a seal is merely dropped into a cup or other recess and may be assembled complete at the factory. It will be noted, however, that this type of seal requires the molding and machining of a driving cup into which the element can be dropped and by which the washer as positively driven so as to relieve the sealing element of driving torque. These molding and machining operations are expensive and in some instances it will be desirable to effect a seal between the shaft and the housing directly. Thus, using Fig. 1 as an illustration, it might be desirable to reverse the stationary and rotatable parts so that the sealing washer is driven from the shaft and is sealed therefrom by a suitable resilient sealing element and cooperates with a lapped or ground sealing surface formed on the housing. It would, of course, be desirable to utilize the same sealing element 21 for the shaft seal since it would reduce or even eliminate entirely the need for additional molds.

Turning now to Fig. 2 for a detailed description of a preferred embodiment of this invention, there is shown a shaft 34 which is rotatable in a chamber 35 formed between said shaft and a housing 36. One end of chamber 35 is defined by a closure plate 37 which is secured by bolts 38 or otherwise to housing 36. Mounted in closure plate 37 is a flexible compressible ring 40 which fits into a recess 41 formed on the inside of closure plate 37.

A seat 42 is mounted on ring 40 in such manner that it can adjust its position relative to closure plate 37 to accommodate changes in position of a sealing washer 43. Seat 42 is provided with a sealing surface 44 which cooperates with a sealing surface 45 formed on sealing washer 43 to effect a fluid-tight seal therebetween. Said washer 43 is sealed relative to shaft 34 by means of a sealing element 46 which is identical in every respect to the sealing element 21 of Fig. 1. Thus, sealing element 46 is formed with spaced flanges 22' and 23', cylindrical sections 24' and 25' and a fold 26' connecting the cylindrical sections 24' and 25'. A ferrule 27' having an axially extending flange 28' cooperates with flange 22' and a ferrule 30' having an axially extending flange 31' cooperates with flange 23'. A shell 47 may be fitted over flange 23' and the outer surface of washer 43 to prevent undue swelling of the flange 23', although in a majority of instances, shell 47 may be entirely eliminated. Where used, however, it may be formed integrally with ferrule 30' so as to avoid an extra forming and assembling operation. A spring 33' is compressed between ferrules 27' and 30' and when flange 22' is anchored, will exert a pressure upon washer 43 through ferrule 30' and flange 23' to hold sealing surface 45 in contact with sealing surface 44.

The means for anchoring flange 22' on shaft 34 comprises a sleeve designated generally by the reference character 48 having a section 49 which may or may not be press-fitted upon shaft 34, and an enlarged region 50 at one end and a series of bosses 51 which fit into grooves 52 molded into the interior surface of washer 43 to provide a sliding driving connection with the washer. Between enlarged portion 50 and shaft 34 is compressed a packing ring 53 made of natural or synthetic rubber, or the like, which serves to provide a seal between sleeve 48 and shaft 34 and also, because of the snugness of the fit, provides a driving connection therebetween. In order to take the axial thrust of spring 33' a radially extending flange 54 may be formed adjacent enlarged portion 50, although this thrust may be taken by ferrule 27' since the latter is preloaded upon cylindrical section 24' which in turn is preloaded upon enlarged portion 50.

In the form shown in Fig. 4, a seal is effected between flange 54 of sleeve 48 and flange 22' of sealing element 46, but a seal is likewise available by the compression of cylindrical region 24' upon enlarged region 50 of sleeve 48 by the axial flange 28' on ferrule 27'. It will be observed that ring 53 is held against movement in an axial direction to the left as viewed in Fig. 2 by shoulder 39. This shoulder, however, may be dispensed with where the axial pressures are not very great and where the sleeve 50 and ring 53 are compressed sufficiently tightly upon shaft 34 to resist axial movement. As a precautionary measure, sealing washer 43 is provided with an axially extending flange 55 which is telescoped within cylindrical section 25' and performs the same function as tubular section 32 of Fig. 1. This construction lends support to the cylindrical section 25' under high pressures exerted upon the exterior surface of sealing element 46.

In assembling a seal such as that shown in Fig. 2, the spring, ferrules 27' and 30' and sealing element 46 are assembled in the usual manner—that is to say, the spring 33' is first assembled with the ferrules on either end and then the sealing element is threaded through the spring until the spring and ferrules are positioned between the flanges of the sealing element. Next, the sleeve is preloaded upon cylindrical portion 24' until flange 54 abuts flange 22' and then finally washer 43 is indexed properly relative to the sleeve so that the boss 51 fits between slot 52 and then is pushed back until flange 23' abuts the back of the washer. Lastly, ring 53 is pressed into the enlarged portion 50 and then the entire assembly is ready for a press-fit upon a shaft such as shaft 34. In addition to providing support for cylindrical portion 25', the axially extending flange 55 of washer 43 provides a means for holding washer 43 in place during shipment and while the seal is being installed upon the shaft. Were it not for this construction, sleeve 47 might be required to hold washer 43 in place, or, alternatively, it might be required to cement washer 43 to flange 23'. By forming the axial flange as an integral part of washer 43 in the mold by which the washer is made, a simple means is provided for assembling the washer with the sealing element 46 at the factory without fear that the washer will be displaced in transit.

It is obvious that by the addition of a simple sleeve and sealing ring 53, the sealing element 21 of Fig. 1 has been transformed into a shaft seal without any modification of the sealing element 21 whatsoever. Thus, the sealing element 21 is made available for a greater variety of installations and its field of application becomes vastly increased.

Referring now to Fig. 4 for a description of the modification of the seal of Fig. 2, there is shown the left-hand fragment of the seal of Fig. 2 including the flange 22' of the sealing element 46, the ferrule 27' with its axially extending flange 28', spring 33', cylindrical section 24', sleeve 48 with its enlarged portion 50 and flange 54, a shaft 34 with a shoulder 39. In this construction, the drive between shaft 34 and sleeve 48 is effected mainly through the press-fit established between the reduced section 49 and the shaft, or between enlarged portion 50 and shoulder 39, or both, without reliance upon any preloading upon a sealing element which may be used therebetween. Thus, in the space 56 formed between enlarged portion 50 and shaft 34, may be inserted ordinary packing such as is used in stuffing boxes since the function of the packing would be merely to prevent the flow of fluids between shaft 34 and sleeve 48 and it would not be required to be particularly resilient since no drive is to be transmitted through the packing.

It is understood that the seal of Fig. 4 is in all other respects identical to that shown in Fig. 2. The elimination of the preloaded ring 53, however, eliminates an additionally molded ring and substitutes therefore a cheaper packing ring which may be cut from a spiral coil of the material with an angle cut as is customary in the case of packing for stuffing boxes. The fit between reduced section 49 and shaft 34 need not be particularly fluid-tight; it is required merely to be sufficiently tight to provide a drive between the shaft and sleeve. Thus, it need not be ground or reamed after its formation in the press.

The modification shown in Fig. 5 is similar to that shown in Fig. 4 except that shaft 34 has pressed thereon a machine element such as the impeller of a pump, such element being formed with a radially extending surface 58 against which flange 22' is made to bear. Cylindrical portion 24' is press-fitted upon an axially extending flange 59 formed integrally with machine element 57 and spaced from shaft 34. On the inside cylindrical surface 60 of flange 59 is press-fitted a tube 61 which performs the function of sleeve 48 of Fig. 2. Said tube 61 has a sliding, driving connection with washer 43 which is identical with the sliding, driving connection between sleeve 48 and washer 43 of Fig. 2. In this construction, if economy is of prime importance, the cost of the seal may be reduced by eliminating tube 61 and utilizing the spring 33 for effecting a drive between machine element 57 and washer 43. Where a positive drive is essential, however, the tube 61 may be used as shown and it may be press-fitted into a flange such as flange 59 or it may be press-fitted directly upon a shaft 34 as in Fig. 2. Various other ways of press-fitting tube 60 upon either the shaft or machine element 57, either internally of washer 43 or exteriorly, will suggest themselves to those skilled in the art.

It is apparent that by the construction shown in Fig. 2, and as modified in Figs. 4 and 5, there has been provided a means for utilizing a flanged sealing element either as a simple sealing element between two parallel radially extending faces, or as a sealing element between a radial face on a sealing washer and a cylindrical surface on a shaft or other machined element, and that the cost of producing a shaft seal in addition to the parallel face type of seal has been materially reduced since no new molds are required for the formation of the flexible, extensible sealing element. It is also apparent that by simply changing the thickness of the ring 53 or the enlarged region 50, one size of sealing element can be used with several sizes of shafts.

It is understood that the foregoing description is merely illustrative of preferred embodiments of the invention and that the scope of the invention therefore is not to be limited thereto but is to be determined by the appended claims.

What is claimed is:

1. A sealing device for relatively rotatable elements comprising a sleeve surrounding one of the elements, an enlarged part at one end of the sleeve, a resilient band compressed between the enlarged part and the element surrounded by the sleeve to form a fluid-tight seal therebetween and to provide a drive for the sleeve, a sealing surface on the other element, a sealing washer surrounding the sleeve and having a sealing surface in contact with the first-mentioned sealing surface, flexible tubular means having a cylindrical part at one end in engagement with the exterior surface of the enlarged part and a flange at the other end in fluid-tight engagement with the washer, a ferrule clamping the cylindrical part upon the said enlarged part, and a slidable driving connection between the washer and sleeve.

2. A sealing device for relatively rotatable elements comprising a sleeve surrounding one of the elements, resilient means compressed between the sleeve and the element surrounded thereby to form a fluid-tight seal therebetween, a sealing surface on the other element, a sealing washer having a sealing surface in engagement with the first-mentioned sealing surface, tubular flexible means having a cylindrical part at one end in contact with the sleeve and a flange at the other end in contact with the washer, a ferrule adapted to clamp the cylindrical part against the sleeve to form a fluid-tight seal therebetween, a ferrule adjacent the flange, spring means compressed between the ferrules for urging the flange against the washer in sealing engagement therewith, and a sliding driving connection between the sleeve and washer.

3. A sealing device for relatively rotatable elements comprising a sleeve surrounding one of the elements, an enlarged part at one end of the sleeve, a resilient band compressed between the enlarged part and the element surrounded by the sleeve to form a fluid-tight seal therebetween and to provide a drive for the sleeve, a sealing surface on the other element, a sealing washer having a sealing surface in engagement with the first-mentioned sealing surface, tubular flexible means having a cylindrical part at one end in contact with the enlarged part and a flange at the other end in contact with the washer, a ferrule adapted to clamp the cylindrical part against the sleeve to form a fluid-tight seal therebetween, a ferrule adjacent the flange, spring means compressed between the ferrules for urging the flange against the washer in sealing engagement therewith; and a sliding driving connection between the sleeve and washer.

4. A sealing device for relatively rotatable elements comprising a sleeve surrounding one of the elements, an enlarged part at one end of the sleeve, a resilient band compressed between the enlarged part and the element surrounded by the sleeve to form a fluid-tight seal therebetween and to provide a drive for the sleeve, a sealing surface on the other element, a sealing washer having a sealing surface in engagement with the first-mentioned sealing surface, annular sealing means for effecting a seal between the washer and sleeve comprising spaced flanges, a fold located substantially mid-way between the flanges, and connecting portions between the fold and flanges, one of said flanges contacting the washer and one of said connecting portions contacting the enlarged region of the sleeve, means for compressing the said one of said connecting portions against the sleeve, spring means located between the flanges and exerting a separating force between them, and a driving connection between the sleeve and washer.

5. A sealing device for a rotatable structure and a housing therefor, said device comprising a sleeve surrounding the structure and driven thereby, an enlarged part at one end of the sleeve, fluid-tight packing between the enlarged part and the structure, a sealing surface on the housing, a washer having a sealing surface in engagement with the first-mentioned sealing surface, a resilient compressible annular sealing means surrounding the sleeve for effecting a seal between the washer and sleeve; said sealing means comprising spaced radially extending flanges, a fold located substantially mid-way between the flanges and connecting portions between the flanges and fold, one of said flanges contacting the washer and one of said connecting portions contacting the enlarged part of the sleeve; a ferrule adjacent one of said flanges having an axial flange compressing the said one of said connecting portions against the enlarged part of the sleeve, a second ferrule adjacent the other sealing means flange, a spring compressed between the flanges, and a driving connection between the sleeve and washer.

FRANK E. PAYNE.

REFERENCES CITED

The following references are of record in the file of this patent:

UNITED STATES PATENTS

| Number | Name | Date |
| --- | --- | --- |
| 1,897,280 | Schwitzer et al. | Feb. 14, 1933 |
| 1,931,723 | Fageol et al. | Oct. 24, 1933 |
| 1,956,366 | Vedovell | Apr. 24, 1934 |
| 2,233,624 | Magnesen | Mar. 4, 1941 |
| 2,347,118 | Matter | Apr. 18, 1944 |

FOREIGN PATENTS

| Number | Country | Date |
| --- | --- | --- |
| 491,412 | Great Britain | 1938 |
| 664,854 | France | 1929 |